United States Patent [19]

Gallagher

[11] Patent Number: 4,644,935
[45] Date of Patent: Feb. 24, 1987

[54] SOLAR HEATER CONTROL

[75] Inventor: Daniel M. Gallagher, Tampa, Fla.

[73] Assignee: Rayflow Corp., Tampa, Fla.

[21] Appl. No.: 652,643

[22] Filed: Sep. 21, 1984

[51] Int. Cl.⁴ .............................................. F24J 2/04
[52] U.S. Cl. ................................... 126/437; 126/419;
126/422; 126/423; 251/304
[58] Field of Search ............... 126/437, 422, 419, 423;
137/59, 60, 61, 62, 625, 46; 251/71, 133, 134,
193, 301, 304; 237/1 A

[56] References Cited

U.S. PATENT DOCUMENTS

| | | | |
|---|---|---|---|
| 3,954,047 | 5/1976 | Miniere | 251/304 X |
| 4,010,734 | 3/1977 | Chayet | 126/437 X |
| 4,061,132 | 12/1977 | Ashton et al. | 126/419 |
| 4,126,122 | 11/1978 | Bross | 126/437 X |
| 4,133,338 | 1/1979 | Honikman | 126/420 |
| 4,169,491 | 10/1979 | Bajka | 126/416 |
| 4,191,166 | 3/1980 | Saarem et al. | 126/420 X |
| 4,254,636 | 3/1981 | Zebuhr | 251/304 X |
| 4,261,332 | 4/1981 | Stewart | 126/416 X |
| 4,307,707 | 12/1981 | Stewart | 126/416 X |

Primary Examiner—Larry Jones
Attorney, Agent, or Firm—Frijouf, Rust & Pyle

[57] ABSTRACT

A solar heater control system is disclosed for use with a water reservoir and a solar collector. Forced circulation of water in the solar heater system is provided by a pump, and valve means provides direct control of water flow in various parts of the solar heater system. Both the pump and the valve means are collected by control means which accepts inputs in the form of temperatures sensed in the water reservoir and in the solar collector. The control means controls the pump and the valve means to cause circulation of water within the system when sensed conditions are suitable for heating, and automatic drainage of the solar collector is effected whenever freezing or over temperature conditions are sensed, or when a power failure occurs. When neither heating conditions nor drainage conditions are sensed, fluid communication between the solar collector and the remainder of the system is terminated by the valve means to isolate the water in the solar collector from the water in the remainder of the system.

12 Claims, 19 Drawing Figures

SOLAR HEATER CONTROL

BACKGROUND OF THE INVENTION

1. Field of the Invention

This invention relates to solar water heater systems and more particularly to an apparatus for controlling water flow and isolating water in a solar heater system.

2. Information Disclosure Statement

Solar energy has been widely used to heat water for such things as residential use and swimming pools. Most such systems employ a solar collector which receives the radiant solar energy and directs it into the water to be heated. Circulation of water through the solar collector is desirable in such systems so that the heat acquired by the water in the solar collector may be transferred to a reservoir such as a hot water tank for future use. Circulation of the water by convection is generally unsatisfactory, and therefore forced circulation by use of a pump has been generally employed in such systems. Certain control means are typically employed to avoid losing energy from the system, as well as to avoid absorbing too much energy into the system. Such control means normally include temperature sensors and control circuits which permit the pump to circulate water in the system only when the sensed temperature of the water in the solar collector is higher than the sensed temperature of water in the reservoir or water tank. High temperature sensing means are also employed to stop the circulation of the water and thereby avoid overheating the water in the tank when too much radiant solar energy is absorbed by the system. Such systems are usually connected to a residential hot water supply system, and it is therefore also desirable to employ valve means to directly control the flow of water in the solar heater system, in addition to control of the circulation pump. The use of valve means in such a system also provides for automatic drainage of the system in the event of a power outage or a sensed low temperature condition which could freeze the water in the solar collector and thereby damage the solar collector. Even without experiencing freezing temperatures, however, a problem known as nighttime thermosiphoning or backsiphoning is experienced in such systems unless special precautions are taken. In those latitudes in which solar heating of water is economically feasible, there is always a period of darkness in each 24 hour period. During those periods of darkness, thermal energy from the water in the solar collector tends to be radiated into the atmosphere, and the water temperature in the hot water tank is typically significantly above that in the solar collector. Thus convection currents may be set up, and the phenomenon known as thermosiphoning occurs, in which the hot water from the hot water tank is conducted through the interconnecting plumbing to the solar collector where the hot water radiates thermal energy into the atmosphere before returning as cooler water to the hot water tank. Without the input of auxiliary heat from a gas or electric immersion heater, experience has shown that the water in a typical 40-gallon hot water tank may drop 14° F. or more during the night in an open system. Of course, typical systems employ auxiliary heat, with the result that thermosiphoning merely serves to pump thermal energy from the auxiliary heater ultimately into the atmosphere where it is lost to the hot water system. Perhaps the most common way of reducing nighttime circulation due to thermosiphoning is to employ one or more spring-loaded check valves within the system. Although the use of check valves is one of the most common methods heretofore used to prevent thermosiphoning, it has two serious drawbacks. First, such check valves tend to restrict the flow of water unduly in the normal operating mode. Secondly, such spring-loaded check valves tend to become clogged with scale and either become stuck in the open position or fail to close completely so that at least some degree of thermosiphoning still occurs. The use of a "heat trap" alone produces results inferior to those of check valves. Separate motor driven valves may be employed in such systems with results superior to that of the spring-loaded check valve, but system complexity and cost is increased considerably, and reliability suffers. The prior art has failed to provide an apparatus for preventing nighttime thermosiphoning in a solar water heating system which is reliable, effective and inexpensive.

Therefore, it is an object of this invention to provide an apparatus which overcomes the aforementioned inadequacies of the prior art devices and provides an improvement which is a significant contribution to the advancement of the pertinent art.

Another object of this invention is to provide a solar heater control system for use with a water reservoir and a solar collector comprising a single valve means for controlling water flow in the solar heater system, a pump for circulating water in the solar heater system, means for sensing the temperature of the water in the reservoir and in the solar collector, and control means for controlling the operation of the pump and the valve means as a function of the temperatures sensed in the reservoir and the solar collector.

Another object of this invention is to provide a solar heater control system including a single valve means for permitting fluid communication between the circulating pump and the solar collector so that water may circulate from the reservoir to the collector, and simultaneously permitting fluid communication between the outlet of the collector and the water reservoir for conducting the solar heated water into the reservoir.

Another object of this invention is to provide a solar heater control system including a single valve means which provides for automatically draining the water from the solar collector when excessively high or excessively low temperatures are sensed in the water in the solar collector.

Another object of this invention is to provide a solar heater control system including a single valve means which prevents nighttime thermo-siphoning by stopping fluid communication between the solar collector and the reservoir and pump when the requisite heating conditions are not met and simultaneously when the conditions prerequisite for draining of the solar collector are not present.

Other objects and a fuller understanding of this invention may be had by referring to the summary of the invention, the description and the claims, taken in conjunction with the accompanying drawings.

SUMMARY OF THE INVENTION

This invention may be incorporated into a solar heater system utilizing a water reservoir such as a residential hot water tank, a solar collector for collecting radiant solar energy and heating water therein, and a pump for circulating water from the hot water tank to the solar collector and back to the hot water tank.

Means are provided for controlling the operation of the circulating pump so that the pump is operated only when the temperature of the water in the solar collector is higher than that in the hot water tank and the temperature of the water in the hot water tank is not above a preset limit. Means are also provided for directly controlling the flow of water in the solar heater system so that the water in the solar collector may be automatically drained from the system either when an over-temperature condition is sensed which could cause damage or when a low temperature is sensed in the water in the solar collector so that freezing of water in the solar collector may be prevented. Means are also provided for terminating all fluid communication between the solar collector and the pump and hot water tank when the sensed temperatures are such that neither heating nor draining conditions are encountered, thus isolating the water in the solar collector from the water in the remainder of the system for preventing energy loss through thermo-siphoning.

A circulating pump draws water to be heated from the hot water tank or reservoir and pumps the water through a water supply line into valve means which includes multiple ports, valve motor means and a moveable valve gate means which enables the valve means to assume different configurations, herein referred to as positions of the valve means. In a first position of the valve means, the water pumped from the hot water tank is conducted into a collector water supply line which is connected to the solar collector inlet. After circulating through the solar collector, the water leaves the solar collector through the solar collector outlet and is conducted through a solar heated water supply line back to the valve means through which it is conducted to a hot water supply line for conducting hot water back to the hot water tank. This first position of the valve means corresponds to the heat mode in which the sensed temperature of the water in the solar collector is higher than the sensed temperature of the water in the hot water tank, and the sensed temperature of the water in the hot water tank is not above a preset limit.

It is desirable to avoid a low temperature condition in the water in the solar collector, which may result in freezing. It is also desirable to avoid an over temperature condition of the water in the system, which may result in boiling and increased pressure. Either freezing or boiling conditions may result in damage to the solar collector and other parts of the system. When either of such conditions is sensed by the temperature sensors at the solar collector and at the reservoir, or when a power failure occurs such that these conditions cannot be sensed, the control power is removed from the valve means. Biasing means are included within the valve means to urge the valve means in the direction from the first position to a third position which connects both the collector water supply line and the solar heated water supply line to drain lines, thereby causing all the water to drain from the solar collector. In this third position, the valve means also seals the water supply line and the hot water supply line which are in fluid communication with the pump and the water tank respectively, so that water is not lost from the remainder of the system. This third position of the valve means corresponds to the drain mode.

To aid in draining the water from the solar collector portion of the solar heater system, a vacuum breaker valve is employed. The usual practice in such solar heater systems is to mount the solar collector on an incline approximately equal to the latitude of the system; the collector water supply line conducting water from the valve means to the solar collector is normally connected to the lower end of the solar collector, while the solar heated water supply line which conducts the heated water from the solar collector back to the valve means is normally connected to the higher end of the solar collector. In the preferred embodiment, the vacuum breaker valve is installed near the highest point in the entire system, in the solar heated water supply line adjacent the upper end of the solar collector. An automatic air vent valve is also installed in the solar heated water supply line adjacent the solar collector for automatically venting air from the system when the system is being filled with water. In the preferred embodiment, a pressure relief valve is also connected to the solar heated water supply line at a point near the solar connector for releasing fluid from within the solar heated water supply line when the pressure therein exceeds a preset limit.

The valve means can also be disposed in a second position intermediate between the first and third position which terminates fluid communication with all ports of the valve means, thus completely isolating the water in the solar collector from the water in the remainder of the system. The second position of the valve means corresponds to the isolation mode of the solar heater control system which positively prevents thermo-siphoning.

Water temperature is sensed at two different points in the system, according to this invention. A tank temperature sensor, preferably located near the lower end of the water reservoir, is utilized for sensing the temperature of the water in the water tank and more particularly, in the lower end of the hot water tank. Water temperature is also sensed at the "hot" or upper end of the solar collector by placing a sensor in the solar heated water supply line adjacent the solar collector. In the preferred embodiment, two separate sensors are utilized in the solar heated water supply line adjacent the solar collector, one for sensing high temperatures and one for sensing low temperatures, and both the collector high temperature sensor and the collector low temperature sensor as well as the tank temperature sensor are thermistors. Information from these temperature sensors is accepted by control means logic which develops one of three signals for any combination of input information from these temperature sensors. As outlined above, the temperature sensors may indicate that conditions are appropriate for heating, in which case the control means logic develops a heat signal. Similarly, the control means logic develops a drain signal when conditions are appropriate for draining water from the solar collector, and the control means logic develops an isolation signal when neither heating conditions nor draining conditions are sensed. These three outputs of the control means logic are mutually exclusive.

When the output of the control means logic comprises the heat signal, full power is applied to both the valve means and the pump, causing the valve means to be driven by the internal valve motor means to the first position, and simultaneously causing the pump to begin to circulate water throughout the solar heater system. As indicated previously, when the sensed temperatures are appropriate for drainage of water from the solar collector due to excessively low or excessively high temperatures, the output of the control means logic comprises the drain signal, which serves to remove all power from both the pump and the valve motor. A power failure will obviously have an identical result. In either event, biasing means contained within the valve means drives the valve means in the direction from the first position to the third position, which connects both water lines from the solar collector to drain lines in order effect the drainage of water from the solar collector; simultaneously the remainder of the system is sealed by the valve means.

The only other mutually exclusive output possible from the control means logic is the isolation signal, which inhibits operation of the circulation pump but simultaneously provides reduced power to the valve motor means, this reduced power being just sufficient to provide a force to balance the opposing force provided by the biasing means when the valve means and valve motor means are in the second position, intermediate between the first and third positions. It is in this second position that all water ports are sealed in the valve means, so that no thermal transfer by conduction from the hot water reservoir to the solar collector may occur, thereby preventing thermosiphoning. The valve means contains a switch for determining when the valve means is in the second position; the above-mentioned reduced power applied to the valve motor means in the second position of the valve means is applied through this switch to effect the isolation mode of this solar heater control system.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment enclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE DRAWINGS

Figure 1:
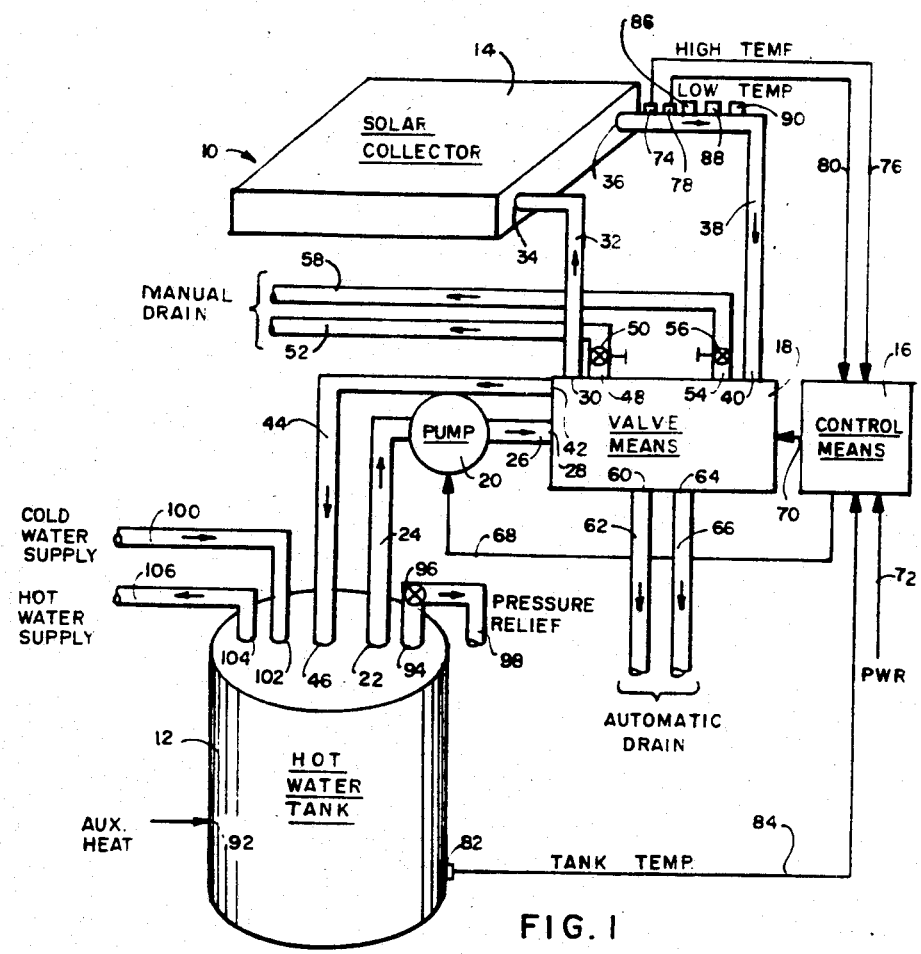
FIG. 1 is a block diagram of a complete solar heater system embodying the present invention.

A block diagram of a complete solar heater system 10 embodying the solar heater control system of the present invention is shown in FIG. 1. In general, such systems are intended to utilize radiant energy from the sun to heat water which is then contained in some type of reservoir. The two most common uses are for swimming pools and residential hot water. The preferred embodiment depicted in FIG. 1 discloses the latter type of system, wherein the water reservoir is a residential hot water tank 12 of the five-fitting type commonly used with solar heating systems. In addition to the hot water tank 12, the major components of the complete solar heater system 10 are the solar collector 14, a control means 16, a valve means 18, and a pump 20. A hot water tank outlet 22 is connected to a water supply line in the form of pipe 24 which conducts water from hot water tank 12 to pump 20. Water is conducted from the outlet of pump 20 to valve means 18 by way of pipe 26. Water from pump 20 enters valve means 18 by way of valve inlet 28 depicted in more detail in subsequent figures. In a first position of valve means 18 corresponding to an operating position, water from pipe 26 and valve inlet 28 is gated through valve means 18 to valve outlet 30 and then through pipe 32 which is the collector water supply line. Pipe 32 terminates at collector inlet 34 which is generally located near the lower end of the inclined solar collector 14. Water from the solar collector 14 leaves through collector outlet 36 and through pipe 38 which comprises a solar heated water supply line. Pipe 38 terminates at valve inlet 40 in valve means 18. In the aforementioned first position corresponding to the operating position of valve means 18, water from the solar heated water supply line is gated through valve means 18 to valve outlet 42 which is connected to pipe 44 which comprises a hot water supply line for conducting hot water to a tank inlet 46 where it enters the hot water tank 12.

In the preferred embodiment, another valve outlet 48 is equipped with a manual valve 50 connected to a drain pipe 52 to provide a manual drain capability which, as will be seen in subsequent figures, enables direct draining of pipe 32. Similarly, valve outlet 54 is fitted with manual valve 56 connected to drain pipe 58 to provide a direct manual drain capability for pipe 38 from solar collector 14. In the preferred embodiment, valve means 18 also includes valve outlet 60 connected to pipe 62, and valve outlet 64 connected to pipe 66 to provide a dual automatic drain capability to be described in more detail subsequently.

Pump motor control 68 and valve means 70 indicated in FIG. 1 are effected through outputs from control means 16 which accepts external power by way of control means power line 72. A collector high temperature high sensing means 74 generates a high temperature signal which is conducted to control means 16 by way of signal line 76. Similarly, collector low temperature sensing means 78 generates a low temperature signal which is conducted to control means 16 by way of signal line 80. A tank temperature sensing means 82 is also employed, preferably located near the lower end of the water reservoir or hot water tank 12; tank temperature sensing means 82 generates a tank temperature signal which is conducted to control means 16 by way of signal line 84.

An automatic air vent valve 86 is installed in pipe 38 near the solar collector for automatically venting air from the solar heated water supply line when pipe 38 is being filled with water. Also mounted on pipe 38 near solar collector 14 is pressure relief valve 88 for releasing fluid within pipe 38 when the pressure therein exceeds a preset limit. A third valve in the form of an automatic vacuum breaker valve is also installed in pipe 38 near solar collector 14 for admitting air from the atmosphere into the solar heated water supply line when the pressure therein falls below atmospheric pressure, which is the condition experienced when the system is being drained.

Hot water tank 12 will typically have an auxiliary heater 92 such as a gas or electric immersion heater. Hot water tank 12 is provided with a tank outlet 94 to which pressure relief valve 96 is connected to vent fluid through drain pipe 98 in the event a high pressure condition is experienced within hot water tank 12. As is customary in the art, a cold water supply pipe 100 conducts water to tank inlet 102 and hot water within the tank is extracted for residential use through tank outlet 104 and hot water pipe 106.

Figure 2:
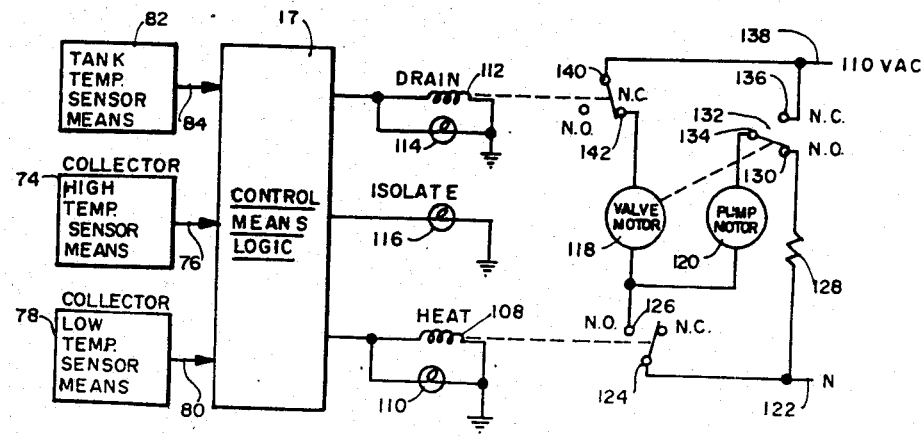
FIG. 2 is a block diagram of the valve and pump control means.

FIG. 2 is a block diagram of the control means for the valve means and the pump. Tank temperature sensor means 82 senses the temperature of the water in the tank and sends this information to control means logic 17 by way of signal line 84. In a similar manner, the temperature of the water in the solar collector is also communicated to control means logic 17. In the preferred embodiment, the collector temperature sensing means actually comprises a collector high temperature sensing means 74 which sends information to control means logic 17 by way of signal line 76, and collector low temperature sensing means 78 which sends information to control means logic 17 by way signal line 80. As described subsequently, control means logic 17 develops one of three signals for any combination of input information from the various temperature sensing means. The three possible output signals are the drain signal, the heat signal, and the isolation signal, and these three outputs are mutually exclusive. When present, the heat signal merely energizes relay 108, together with indicator 110, connected in parallel with relay 108. Similarly, the drain signal, when present, merely energizes relay 112 and indicator 114, wired in parallel with relay 112. The isolation signal performs no function other than to energize indicator 116 in the preferred embodiment.

Valve means 18, previously shown in FIG. 1, contains valve motor 118 as shown in FIG. 2. Valve motor 118, as well as pump motor 120 are directly controlled by the control means as indicated in FIG. 2. Valve motor 118 and pump motor 120 are designed to operate on standard 110 VAC power. The AC neutral line 122 is connected to arm 124 of relay 108 as shown in FIG. 2. When the heat signal is present, relay 108 is energized and the AC neutral line is thereby connected to the normally open contact 126 of relay 108. Contact 126 is connected to one side of both valve motor 118 and pump motor 120. AC neutral is also connected through dropping resistor 128 to the normally open contact 130 of switch 132 which is mechanically coupled to valve motor 118. Arm 134 of switch 132 is directly connected to the remaining connection of pump motor 120. Normally closed contact 136 of switch 132 is directly connected to 110 VAC power 138. This hot side of the power line is also connected to arm 140 of relay 112 which is actuated by the drain signal. Normally closed contact 142 of relay 112 is directly connected to the remaining connection of valve motor 118.

As described subsequently in connection with the description of the valve itself, valve means 18 has three equilibrium positions corresponding to heat, isolation, and drain. As shown in FIG. 2, when the heat signal is present, relay 108 is energized and AC neutral 122 is connected through relay arm 124 and normally open contact 126 to one side of both the valve motor 118 and pump motor 120. 110 VAC power 138 is connected through relay arm 140 and normally closed contact 142 to the remaining connection of valve motor 118 thereby causing valve motor 118 to drive valve means 18 to a first position which corresponds to the heat position. In the first position, valve means 18 and valve motor 118 are in such a position that switch 132 is in its normally closed configuration. Thus 110 VAC power 138 is connected through contact 136 and arm 134 of switch 132 to the remaining connection of pump motor 120, thereby causing the pump to operate and circulate water in the solar heater system.

When the isolation signal is present, only indicator 116 is energized since both the drain signal and the heat signal are absent, thereby causing relay 112 and relay 108 to be de-energized. As discussed subsequently in connection with valve means 18, valve means 18 includes a biasing means urging valve means 18, together with valve motor 118, into the third position which corresponds to the drain condition. When the isolation signal is present and the drain and heat signals are absent, 110 VAC power 138 remains connected to valve motor 118 through arm 140 and normally closed contact 142 of the de-energized relay 112. However, since the heat relay 108 is also de-energized, AC neutral 122, which is connected to arm 124 of relay 108, is disconnected from normally open contact 126 of relay 108, and therefore is not connected to either the valve motor 118 or pump motor 120. Under this powerless condition, valve motor 118 (together with valve means 18) is urged toward the third position by the aforementioned biasing means. Prior to reaching the third position from the first position, valve motor 118 (and valve means 18) reaches the second position which is intermediate between the first position and the third position. In the second position of valve means 18 and valve motor 118, switch 132 is in the activated state so that arm 134 contacts the normally open contact 130. Thus as the biasing means urges valve means 18 and valve motor 118 from the first position to the third position it causes the actuation of switch 132 as the second position is reached. At that point, AC neutral 122 is connected through dropping resistor 128, normally open contact 130 and arm 134 of switch 132 to one side of pump motor 120, the other side of which is connected to valve motor 118. The remaining side of valve motor 118 is still connected to 110 VAC power 138 since drain relay 112 is still de-energized. This condition results in reduced power being presented both to valve motor 118 and pump motor 120, which are wired in series in this particular configuration. Resistor 128 is selected such that the voltage drop across resistor 128 combined with the voltage drop across pump motor 120 is high enough to prevent operation of pump motor 120 but is a value appropriate to create a force in valve motor 118 sufficient to balance the force provided by the aforementioned biasing means when valve means 18 and valve motor 118 are in the second position. Thus, when both the drain signal and the heat signal are absent, the isolation signal is present, indicator 116 is illuminated, and valve motor 118 (with valve means 18) will move from the first position to the intermediate second position and remain in the second position so long as the isolation condition prevails in control means logic 17.

When the drain signal is present, drain relay 112 and indicator 114 are energized, thus causing arm 140 to contact the normally open contact of relay 112 and thereby disconnecting all power from valve motor 118. So long as that drain signal is present, valve motor 118 receives no power and the aforementioned biasing means urges valve motor 118 (and valve means 18) to the third position which corresponds to the drain position.

The single remaining possibility is that of a power outage. In that event, there will be no output whatsoever from control means logic 17 and both drain relay 112 and heat relay 108 will be de-energized. There being no power available for energizing valve motor 118, the aforementioned biasing means will again urge valve motor 118 (and valve means 18) to the third position where drainage occurs by force of gravity.

Figure 3:
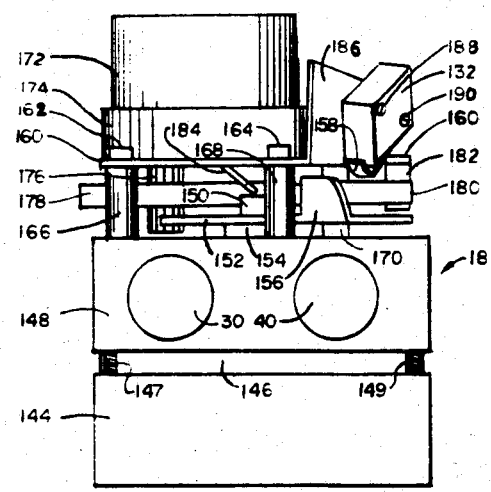
FIG. 3 is a front view of the valve means.

A front view of valve means 18 is depicted in FIG. 3. The primary parts of the valve itself are the lower manifold 144, the spacer 146 which separates the two manifolds, and upper manifold 148. As will be shown in subsequent figures, spacer 146 is a cylindrical structure while lower manifold 144 and upper manifold 148 are of square cross section, held together by a screw at each of the four corners; in FIG. 3, the two screws 147 and 149 visible in the front view are depicted. Sector gear shaft 150 extends through sector gear 152 and collar 154, which serves to separate sector gear 152 from upper manifold 148. Sector gear shaft 150 extends through the center of upper manifold 148. One portion of sector gear 152 is bent upward to form a tab actuator 156 which engages and thereby actuates switch lever 158 of switch 132 when sector gear 152 is in the middle portion of its travel range, which corresponds to the second position of valve means 18. As shown in FIG. 3 and in all other figures unless otherwise specified, valve means 18 is in the third position which causes the system to drain. Valve motor plate 160 is attached to and spaced apart from upper manifold 148 by use of screws 162 and 164, together with hollow cylindrical standoffs 166, 168 and 170, and a third screw (not shown in FIG. 3) extending through valve motor plate 160 and standoff 170. Valve motor 172 with the attached gear box 174 are bolted or otherwise attached to valve motor plate 160 by means well known in the art. For clarity of representation, switch 132 and motor 172 are depicted without their respective electrical connections in FIG. 3. The output of gear box 174 is taken through drive gear 176 which extends between valve motor plate 160 and upper manifold 148. Drive gear 176 engages sector gear 152. Coil spring 178 is attached to and wound around drive gear 176; the other spring end 180 is attached to tab 182 extending from valve motor plate 160 in a manner as shown in subsequent figures. Another tab 184 extends from valve motor plate 160 toward upper manifold 148 at the center thereof so as to limit the end play of sector gear shaft 150. Switch mounting plate 186 is also formed from a part of valve motor plate 160 as shown in FIG. 3. Switch 132 is attached to switch mounting plate 186 by screw 188 and screw 190 in the preferred embodiment.

Figure 4:
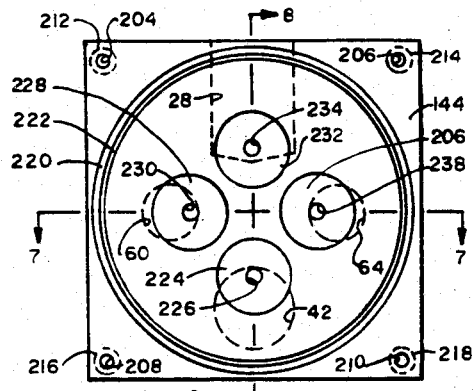
FIG. 4 is a top view of the lower manifold of the valve means.

FIG. 4 is a top view of lower manifold 144 of valve means 18. Screw holes 204, 206, 208 and 210 are located in the corners of lower manifold 144 for the purpose of mounting it to upper manifold 148 as was previously shown in FIG. 3. Each of these screw holes has a screw head recess, respectively 212, 214, 216 and 218 in the lower end thereof. A circular spacer groove 220 to accept one end of spacer 146 is defined in the upper surface of lower manifold 144. A further groove to function as an O-ring groove 222 is defined on the inside radius of spacer groove 220. On the top of lower manifold 144 appear four circular valve ports each of which defines a concentric circular aperture therein: valve port 224, defining aperture 226, appears at the front of lower manifold 144; valve port 228 defining aperture 230 is on the left side thereof; valve port 232 defining aperture 234 is at the rear thereof; and valve port 236 defining aperture 238 is on the right side thereof. As shown in FIG. 4, aperture 226 communicates with valve outlet 42, aperture 230 communicates with valve outlet 60, aperture 234 communicates with valve inlet 28, and aperture 238 communicates with valve outlet 64.

Figure 5:
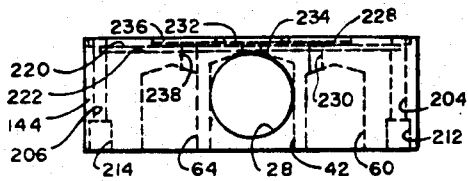
FIG. 5 is a rear view of the lower manifold of the valve means.

FIG. 5 is a rear view of lower manifold 144 of valve means 18. The circular cross section of valve inlet 28 is clearly shown in the rear face presented in this figure. Although not shown in these figures, all valve inlets and outlets of valve means 18 employ standard pipe thread means to facilitate attachment to the remainder of the solar heater system as indicated previously in FIG. 1. Screw holes 204 and 206 with respective head recesses 212 and 214 are shown at either corner of lower manifold 144. Valve outlets 60 and 64 extend most of the way through lower manifold 144 to join respectively apertures 230 and 238 and valve ports 228 and 236. As noted previously, valve port 232 and aperture 234 communicate with valve inlet 28. O-ring groove 222 is seen to extend to a greater depth into lower manifold 144 than spacer groove 220. During assembly, a standard O-ring is place in O-ring groove 222, and spacer 146 is then inserted in spacer groove 220 which tends to compress the O-ring into O-ring groove 222 to form a water tight seal.

Figure 6:
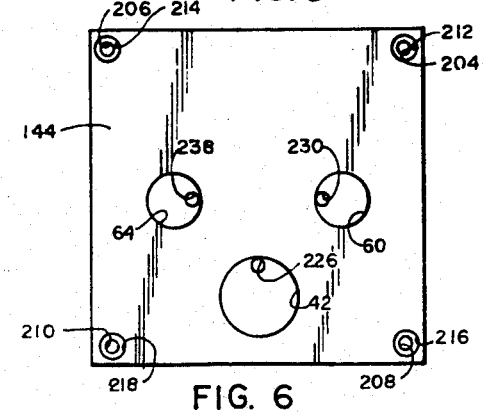
FIG. 6 is a bottom view of the lower manifold of the valve means.

FIG. 6 is a bottom view of lower manifold 144 of valve means 18 showing the corner screw holes 204, 206, 208 and 210 with their respective head recesses 212, 214, 216 and 218 located therein. Valve outlets 60 and 64, together with respective apertures 230 and 238 are clearly visible in this view. Valve outlet 42, communicating with aperture 226 is also visible from the bottom of lower manifold 144.

Figure 7:
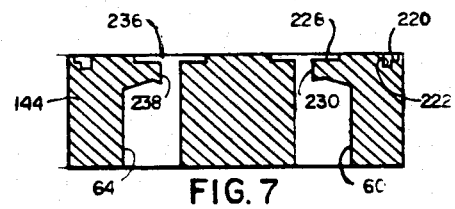
FIG. 7 is a sectional view of the lower manifold of the valve means taken along the line 7—7 of FIG. 4.

FIG. 7 is a sectional view of lower manifold 144 of valve means 18 taken along the line 7—7 as indicated in FIG. 4. This section is taken through the centers of valve outlets 60 and 64, communicating respectively with apertures 230 and 238, as well as valve ports 228 and 236. The cross section configuration of spacer groove 220 and O-ring groove 220 are also clearly depicted on the upper surface of the lower manifold 144.

Figure 8:
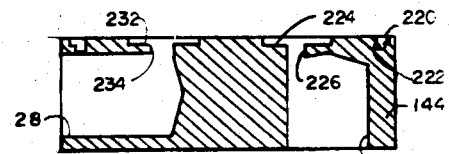
FIG. 8 is a sectional view of the lower manifold of the valve means taken along the line 8—8 of FIG. 4.

FIG. 8 is a sectional view of lower manifold 144 of valve means 18 taken along the line 8—8 of FIG. 4. This section is taken along the centers of valve inlet 28 and valve outlet 42, communicating respectively with aperture 234 and aperture 226, and valve ports 232 and 224.

Figure 9:
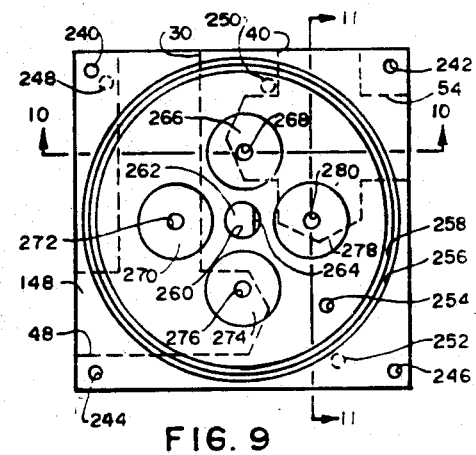
FIG. 9 is a bottom view of the upper manifold of the valve means.

FIG. 9 shows a bottom view of the upper manifold 148 of valve means 18. As in the case of lower manifold 144, upper manifold 148 is pierced at its corners with screw holes 240, 242, 244 and 246, each of which is threaded to accommodate screws such as 147 and 149 upon assembly of valve means 18 as shown previously in FIG. 1. Three threaded motor mount holes 248, 250 and 252 extend into upper manifold 148 from the upper side thereof to secure valve motor plate 160. Stop pin hole 254 is located in the bottom of upper manifold 148 for accommodating a pin to limit the travel of the valve mechanism as subsequently described. As in the case of lower manifold 144, upper manifold 148 also contains a spacer groove 256 and O-ring groove 258 therein. Shaft hole 260 is defined in the center of the upper manifold 148. Shaft end 262, which includes a flat 264, is fitted within shaft hole 260. As in the case of lower manifold 144, upper manifold 148 contains four circular valve ports 266, 270, 274 and 278 which contain respectively concentric, circular apertures 268, 272, 276 and 280. Aperture 268 communicates with valve outlet 54, while aperture 280 communicates directly with valve inlet 40; valve inlet 40 and valve outlet 54 are connected as shown within upper manifold 148. Aperture 272 communicates directly with valve outlet 30 and aperture 276 communicates with valve outlet 48; valve outlets 30 and 48 communicate with each other within upper manifold 148.

Figure 10:
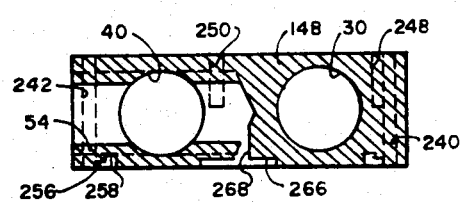
FIG. 10 is a sectional view of the upper manifold of the valve means taken along the line 10—10 of FIG. 9.

FIG. 10 is a sectional view of upper manifold 148 of valve means 18 taken along the line 10—10 of FIG. 9. As indicated in FIG. 10, valve port 266 with communicating aperture 268 is connected directly to valve outlet 54 and valve inlet 40. Valve outlet 30 also appears in the view of upper manifold 148 presented in this figure. Spacer groove 256 and O-ring groove 258 are similar to those previously shown in lower manifold 144.

Figure 11:
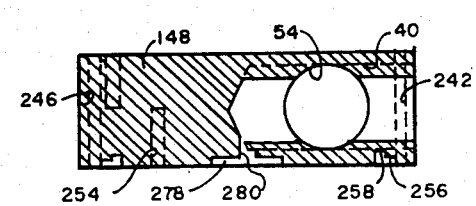
FIG. 11 is a sectional view of the upper manifold of the valve means taken along the line 11—11 of FIG. 9.

FIG. 11 is a sectional view of upper manifold 148 of valve means 18 taken along the line 11—11 of FIG. 9. Threaded screw holes 242 and 246 are shown in the corners of upper manifold 148. Stop pin hole 254 extends approximately half way into upper manifold 148. Spacer groove 256 and O-ring groove 258 also appear in this view. Valve port 278 with communicating aperture 280 defined therein communicate with valve inlet 40 and valve outlet 54 as shown.

Figure 12:
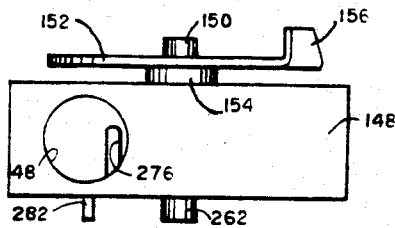
FIG. 12 is a left side view of the upper manifold of the valve means with the stop pin and the sector gear and shaft installed.

FIG. 12 is a left side view of upper manifold 148 of valve means 18 with stop pin 282, sector gear 152, and sector gear shaft 150 installed. As previously mentioned, unless otherwise noted, all figures showing sector gear 152 or valve plate 284 show sector gear 152 and valve plate 284 in the third position which corresponds to the drain position of the solar heater system embodying the present invention. In the view presented in FIG. 12, valve outlet 48 and a portion of communicating aperture 276 are clearly visible. Sector gear 152 is separated from upper manifold 148 by collar 154 on sector gear shaft 150. Sector gear shaft 150 and sector gear 152 are rigidly attached to one another. The tab actuator 156 is shown as a bent portion of sector gear 152. Shaft end 262 of sector gear shaft 150 extends below upper manifold 148.

Figure 13:
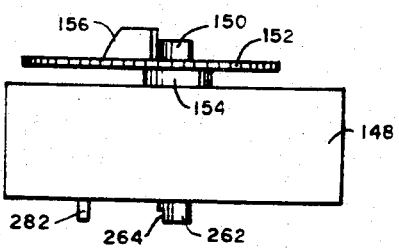
FIG. 13 is a rear view of the upper manifold of the valve means with the stop pin and the sector gear and shaft installed.

FIG. 13 is a rear view of upper manifold 148 of valve means 18 with stop pin 282, sector gear 152 and sector gear shaft 150 installed. In this view, actuator 156 is on the far side of sector gear 152. Shaft end 262, extending below upper manifold 148, contains flat 264.

Figure 14:
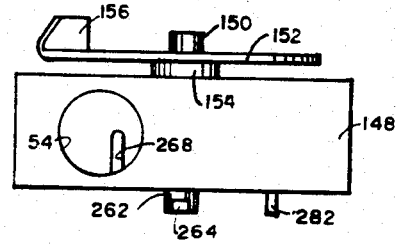
FIG. 14 is a right side view of the upper manifold of the valve means with the stop pin and the sector gear and shaft installed.

FIG. 14 is a right side view of upper manifold 148 of valve means 18 with stop pin 282, sector gear 152 and sector gear shaft 150 installed. Valve outlet 54 and a portion of communicating aperture 268 are visible in this view. Actuator 156 extends above sector gear 152, which is separated from upper manifold 148 by collar 154 on sector gear shaft 150. Shaft end 262, containing flat 264, extends below upper manifold 148 a distance approximately equal to the extension of stop pin 282.

Figure 15:
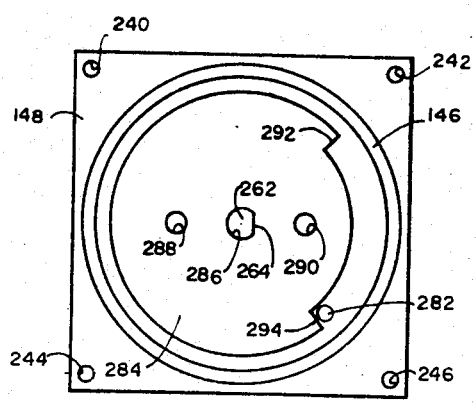
FIG. 15 is a bottom view of the upper manifold of the valve means with the stop pin, the valve plate and the spacer installed.

FIG. 15 is a bottom view of upper manifold 148 of valve means 18 with stop pin 282, valve plate 284 and spacer 146 installed. Threaded screw holes 240, 242, 244 and 246 are shown in the four corners of upper manifold 148. Valve gate means comprising valve plate 284 shown in plan view in FIG. 15, is preferably made from a strong durable material relatively impervious to the effects of chemicals commonly found in potable water systems and swimming pool water systems; in the preferred embodiment, valve plate 284 is fabricated from a brass plate having a thickness comparable to that of sector gear 152 previously disclosed. Valve plate 284 defines at its center a flatted shaft hole 286 which permits valve plate 284 to be placed over shaft end 262 which contains flat 264. Valve plate 284 also defines two diametrically opposed apertures 288 and 290 positioned so as to line up with the centers of opposing pairs of valve ports 266, 270, 274 and 278 described in previous figures. The periphery of valve plate 284 has an annular segment missing, terminated by stop 292 and stop 294 which serve to limit the rotational movement of valve plate 284 and the entire valve mechanism to 90° when used in conjunction with stop pin 282.

Figure 16:
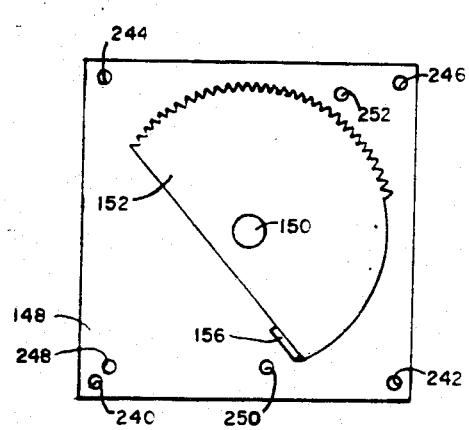
FIG. 16 is a top view of the upper manifold of the valve means with the sector gear and shaft installed.

FIG. 16 is a top view of upper manifold 148 of valve means 18 with sector gear 152 and sector gear shaft 150 installed. As in the previous figure, threaded screw holes 240, 242, 244 and 246 are again shown in the four corners of upper manifold 148 for use in assembling the entire valve means 18. In addition threaded motor mount holes 248, 250, and 252 are shown for attaching valve motor plate 160, not shown in FIG. 16. The upper edge of tab actuator 156 is shown in this view. It should be noted that the toothed portion of sector gear 152 covers an angular range which only slightly exceeds 90° in the preferred embodiment.

Figure 17:
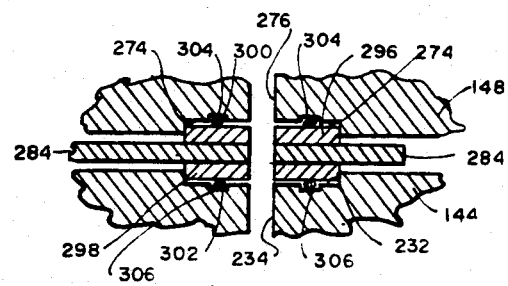
FIG. 17 is an enlarged sectional view of a single valve port of the valve means in the open position.

FIG. 17 is an enlarged sectional view of a single valve port area of valve means 18 in the open position. Valve means 18 is shown in the assembled condition so that a portion of lower manifold 144 is shown in section in the assembled relationship with a section of upper manifold 148. Valve port 232, containing concentric circular aperture 234 is shown in lower manifold 144. Similarly, circular valve port 274 defining concentric circular aperture 276 is positioned in alignment above valve port 232 within upper manifold 148. A small O-ring 300 bears against the face of valve port 274, and an identical O-ring 302 bears against the face of valve port 232 in lower manifold 144. An alternative embodiment is also shown in FIG. 17 in which a small O-ring groove 304, concentric with aperture 276, has been cut into valve port 274 to accept O-ring 300. Similarly, an alternative embodiment is shown in the lower manifold 144 in that it discloses O-ring groove 306 concentric with aperture 234 and valve port 232 to accept O-ring 302. Circular valve disc 296 having a diameter essentially equal to that of valve port 274 is placed in valve port 274. Similarly, valve disc 298 having a diameter essentially equal to that of valve port 232 is placed in valve port 232. Discs 296 and 298 are both of the same approximate thickness as valve plate 284 previously described, and contain therewithin a concentric circular aperture of approximately the same size as apertures 276 and 234 in valve ports 274 and 232 respectively. In the preferred embodiment, discs 296 and 298 are fabricated from reinforced polytetrafloroethylene, commonly known by the brand name Teflon. Sandwiched between disc 296 and 298 is valve plate 284, containing there within aperture 290 which is shown in FIG. 17 in alignment with the disc and manifold apertures so that this valve is shown in the open position. Thus passage of water is permitted from the aperture 234 in lower manifold 144 to aperture 276 in upper manifold 148 with valve plate 284 in the position indicated. The relative positions of the components shown in FIG. 17 are indicated for the first position of valve means 18 in which the system is operating in the heat mode.

Figure 18:
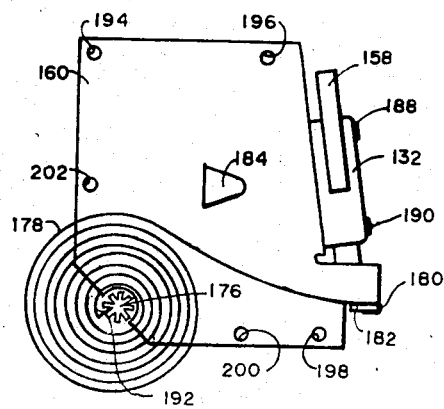
FIG. 18 is a bottom view of the valve motor plate.

FIG. 18 is a bottom view of valve motor plate 160 showing spring end 192 of spring 178 attached to drive gear 176 at the center of the coil of spring 178, the opposite spring end 180 being bent in a U-shape and thereby secured to tab 182 which is a part of valve motor plate 160. A bottom view of switch 132 containing switch lever 158, mounted to the supporting structure by screws 188 and 190 is also disclosed in FIG. 18. Tab 184 is shown in the appropriate position to limit the end play of sector gear shaft 150. Valve mounting holes 194, 196 and 198 are included in valve motor plate 160 as shown. Motor mounting holes 200 and 202 are used for mounting the motor 172 and gear box 174 as previously described.

Figure 19:
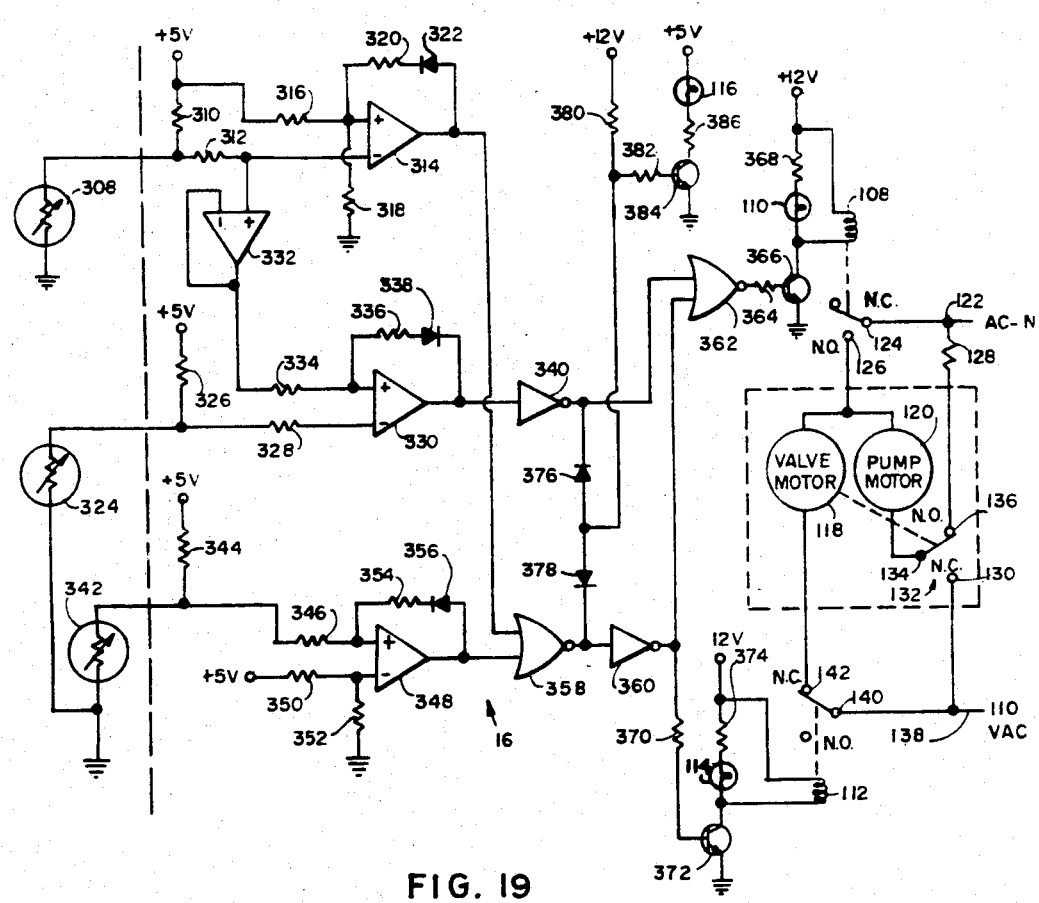
FIG. 19 is a simplified schematic of the control means.

FIG. 19 is a simplified schematic of control means 16 of the present invention. In the preferred embodiment, tank temperature sensing means comprises thermistor 308 as indicated in FIG. 19. Thermistor 308 forms a voltage divider network with resistor 310 which is connected to a +5 VDC supply as indicated. The resulting signal is conducted through resistor 312 to the negative input of comparator 314. The positive input of comparator 314 is developed through a fixed voltage divider comprising resistors 316 and 318, driven from a similar +5 VDC source. Comparator 314 also employs a feedback network comprising resistor 320 and diode 322 connected as indicated between the output and the positive input.

Collector high temperature sensor means 74 comprises, in the preferred embodiment, thermistor 324 as shown in FIG. 19. Thermistor 324 is used in conjunction with resistor 326 and the +5 VDC power supply as indicated to form a voltage divider network, the output of which is conducted through resistor 328 to the negative input of comparator 330. The output of resistor 312 from thermistor 308 is also conducted to amplifier 332 and thence through resistor 334 to the positive input of comparator 330, which employs a feedback network comprising resistor 336 and diode 338. The output of comparator 330 is inverted by inverter 340.

Collector low temperature sensor means 78, in the preferred embodiment, comprises thermistor 342, which is used in conjunction with resistor 344 and the previously mentioned +5 VDC power source to form a voltage divider, the output of which is conducted through resistor 346 to the positive input of comparator 348. The negative input of comparator 348 is derived from a voltage divider driven by the previously mentioned ≡VDC power source through fixed resistors 350 and 352. Comparator 348 employs a feedback loop comprising resistor 354 and diode 356 connected as indicated in FIG. 19. The output of comparators 348 and 314 comprise the input to NOR gate 358, the output of which is subsequently inverted in inverter 360. The outputs of inverters 340 and 360 comprise the inputs to NOR gate 362, the output of which is conducted through the resistor 364 to the base of NPN transistor 366 which is switched on in the heat mode. The emitter of transistor 366 is connected to ground, while the collector is connected to relay means 108 and a +12 VDC power source. In parallel with relay means 108 is connected dropping resistor 368 and indicator 110 to indicate when the control means 16 is in the heat mode.

The output of inverter 360 is also conducted through resistor 370 to the base of NPN transistor 372 which is switched on when control means 16 is in the drain mode. The emitter of transistor 362 is connected to ground, while the collector is connected to relay means 112 and a +12 VDC power source in a manner identical to that for relay means 108 as previously described. In parallel with relay means 112, there is connected dropping resistor 374 and indicator 114 to indicate when control means 16 is in the drain mode. The anodes of diodes 376 and 378 are connected together, and the cathods of diodes diodes 376 and 378 are respectively connected to the outputs of inverter 340 and NOR gate 358 to form a type of NOR gate as indicated in FIG. 19. The anode junction of diode 376 and 378 is connected to resistor 380, the other end of which is connected to a +12 VDC source. The junction of the anodes of diodes 376 and 378 is also connected resistor 382, the other end of which is connected to the base of NPN transistor 384, which is switched on only when the control means 16 is not in either the drain mode or the heat mode. When transistor 384 is switched on, power from a +5 VDC source is conducted through indicator 116 and dropping resistor 386, which is connected to the collector of transistor 384, the emitter of which is grounded as in FIG. 19. Thus the switching on of transistor 384 and the illumination of indicator 116 will occur only when relay means 108 and 112 and indicators 110 and 114 are de-energized.

In the heat mode, relay means 108 is energized and relay means 112 is de-energized. Thus 110 VAC as indicated at 138 in FIG. 19 is conducted through arm 140 and normally closed contact 142 of relay means 112 to one side of valve motor 118. The other side of valve motor 118 and one side of pump motor 120 are connected together and to the normally open contact 126 of relay means 108. Since relay means 108 is energized in the heat mode, AC neutral as indicated at 122 in FIG. 19 is conducted from arm 124 of relay means 108 through the normally open contact 126 of relay means 108 to both valve motor 118 and pump motor 120. Valve motor 118 thus operates and drives valve means 18 to the first position against the force provided by biasing means in the form of coil spring 178. Since switch 132 is not actuated in the first position, 110 VAC at 138 in FIG. 19 is conducted through normally closed contact 130 of switch 132 to arm 134 and thence to the remaining connection at pump motor 120 so that the pump will operate and circulate water through the system.

In the isolation mode, both relay means 108 and relay means 112 are de-energized. Thus AC neutral at 122 in FIG. 19 is not directly connected to either the pump motor 120 or valve motor 118 through the normally open contact 126 and arm 124 of relay means 108. Rather, AC neutral from 122 is conducted through dropping resistor 128, to the normally open contact 136 of switch 132 contained within valve means 18. As previously described, biasing means in the form of coil spring 178 urges valve motor 118 and valve means 18 toward the third position. When valve means 18 is half way between the first position and the third position, switch 132 is actuated by tab actuator 156 which was previously described as part of sector gear 152. At that point AC neutral shown at 122 in FIG. 19 is conducted through dropping resistor 128, through normally open contact 136 and arm 134 of switch 132 to one side of pump motor 120, and thence through pump motor 120 to one connection of valve motor 118. The other connection of valve motor 118 is connected to 110 VAC at 138 in FIG. 19 through normally closed contact 142 and arm 140 of de-energized relay means 112. The value of dropping resistor 128 is selected such that, in conjunction with the voltage drop experienced across pump motor 120, the reduced torque developed in valve motor 118 is exactly sufficient to balance the force provided by biasing means in the form of spring 178 when valve means 18 and valve motor 118 are in the second position. Thus, when control means 16 changes from the heat mode to the isolation mode, valve plate 284 rotates from the first position an angular distance of approximately 45° and stops at that point, thus blocking all valve ports within valve means 18 and thereby isolating solar collector 14 from hot water tank 12.

In the drain condition, relay means 112 is energized, thus completely disconnecting power from valve motor 118. As a result, biasing means in the form of spring 178 urges valve motor 118 and valve means 18 to the third position, which causes complete drainage of the solar collector 14 and connecting lines as previously described. Similarly, in the event of a power outage, spring 178 again controls valve means 18 and valve motor 118 so as to place valve means 18 in the drain configuration and cause drainage of the system.

The present disclosure includes that contain in the appended claims as well as that of the foregoing description. Although the invention has been described in its preferred form with a certain degree of particularity, it is understood that the present invention of the preferred form has been made only by way of example, and that numerous changes in the details of construction and the combination and arrangement of parts may be resorted to without departing from the spirit and scope of the invention.

What is claimed:

1. A solar heater control system for use with a water reservoir and a solar collector, comprising in combination:

a valve means for controlling water flow in the solar heater control system;
a water supply line in fluid communication between the water reservoir and said valve means;
a circulating pump interdisposed in said water supply line for pumping water from the water reservoir through said valve means;
a collector water supply line in fluid communication between said valve means and the solar collector;
a solar heated water supply line for conducting water from the solar collector to said valve means;
a hot water supply line for conducting water from said valve means to the water reservoir;
a first drain line connected to said valve means for conducting water from said valve means to a discharge point;
a reservoir temperature sensing means for sensing the temperature of the water in the water reservoir;
a collector temperature sensing means for sensing the temperature of the water in the solar collector;
a control means for controlling the operation of said pump and the operation of said valve means as a function of the output of said reservoir temperature sensing means and the output of said collector temperature sensing means;
said valve means further including:
a first and a second inlet;
a first, second, a third, and a fourth outlet;
valve gate means capable of motion between a first position and a third position;
a motor for driving said valve gate means in a direction from said third position toward said first position;
biasing means for urging said valve gate means in a direction from said first position towards said third position;
wherein said valve gate means permits fluid communication between said first inlet and said first outlet and simultaneously permits fluid communication between said second inlet and said second outlet when said valve gate means is disposed in said first position to enable the water to be pumped by said pump from the water reservoir to the solar collector in order to heat the water in the solar collector and back to the water reservoir where the sensed temperature condition of the water in the solar collector is higher than the sensed temperature condition of the water in the water reservoir;
wherein said valve gate means permits fluid communication between said first outlet and said third outlet and simultaneously permits fluid communication between said second inlet and said fourth outlet when said valve gate means is disposed in said third position to enable water to be drained from said collector supply line, said solar heated supply line and the solar collector where a low temperature condition is sensed at the solar collector which may result in freezing of the water in said collector supply line, said solar heated supply line and the solar collector, or where an over temperature condition is sensed at the solar collector which may result in boiling and increased pressure of the water in said collector supply line, said solar heated supply line and the solar collector or where an electrical power failure occurs thereby preventing the sensing of said temperature conditions and to further seal said water supply line and said water reservoir supply line to prevent loss of water therefrom; and wherein fluid communication with said first inlet, said second inlet, said first outlet, said second outlet, said third outlet and said fourth outlet is blocked by said valve gate means when said valve gate means is disposed in a second position to completely isolate water in said collector supply line, and solar heated supply line and the solar collector from water in the remainder of the system to prevent thermosiphoning where the sensed temperature condition of the water in the solar collector is lower than the sensed temperature condition of the water in the water reservoir.

2. An apparatus as set forth in claim 1, wherein said water supply line is in fluid communication with said first inlet;
said collector water supply line is in fluid communication with said first outlet;
said solar heated water supply line is in fluid communication with said second inlet;
said hot water supply line is in fluid communication with said second outlet;
said first drain line is in fluid communication with said third outlet; and
a second drain line is in fluid communication with said fourth outlet.

3. An apparatus as set forth in claim 2, wherein the solar collector is mounted on an incline and wherein said solar heated water supply line connects to the solar collector at a point higher than said collector water supply line.

4. An apparatus as set forth in claim 3, further comprising in combination:
an automatic air vent valve installed in said solar heated water supply line near the solar collector for automatically venting air from said solar heated water supply line when said solar heated supply line is being filled with water;
a pressure relief valve installed in said solar heated water supply line near the solar collector for releasing fluid within said solar heated water supply line when the pressure therein exceeds a preset limit; and
an automatic vacuum breaker valve installed in said solar heated water supply line near the solar collector for admitting air from the atmosphere into said solar heated water supply line when the pressure in said solar heated water supply line falls below atmospheric pressure.

5. An apparatus as set forth in claim 4, wherein said reservoir temperature sensing means is located near the lower portion of the water reservoir and said collector temperature means is located near the higher portion of the solar collector.

6. An apparatus as set forth in claim 5, wherein said reservoir temperature sensing means is connected to said control means and wherein said collector temperature sensing means is also connected to said control means.

7. An apparatus as set forth in claim 6, wherein said control means generates a drain signal which disconnects power to said valve motor means when said collector temperature sensing means senses that the temperature of the water in the solar collector is above a preset limit; and wherein
said control means generates said drain signal which disconnects power from said valve motor means when said collector temperature sensing means senses that the temperature of the water in the solar collector is below a preset limit.

8. An apparatus as set forth in claim 7, wherein said control means generates a heat signal which connects full power to said valve motor means and to said pump when said collector temperature sensing means and said reservoir temperature sensing means sense that the temperature of the water in the water reservoir is not above a preset limit and simultaneously that the temperature of the water in the solar collector is not below a preset limit and simultaneously that the temperature of the water in the solar collector is more than a preset amount higher than the temperature of the water in the water reservoir.

9. An apparatus as set forth in claim 8, wherein said control means connects reduced power to said pump and to said valve motor means when said drain signal is absent and simultaneously when said heat signal is absent and simultaneously when said valve means is in said second valve position, said reduced power being insufficient to drive said pump and said reduced power being sufficient in said valve motor means to balance the force provided by said biasing means when said valve means is in said second valve position thereby isolating the water in said collector supply line, said solar heated supply line and the solar collector from water in the remainder of the system to prevent thermosiphoning.

10. A valve for controlling water flow in a solar heater system, comprising in combination:
a first and a second inlet;
a first, a second, a third, and a fourth outlet;
valve gate means capable of motion between a first position and a third position;
wherein said valve gate means permits fluid communication between said first inlet and said first outlet and simultaneously permits fluid communication between said second inlet and said second outlet when said valve gate means is disposed in said first position;
wherein said valve gate means permits fluid communication between said first outlet and said third outlet and simultaneously permits fluid communication between said second inlet and said fourth outlet when said valve gate means is disposed in said third position; and
wherein fluid communication with said first inlet, said second inlet, said first outlet, said second outlet, said third outlet and said fourth outlet is blocked by said valve gate means when said valve gate means is disposed in a second position.

11. A valve as set forth in claim 10, further comprising in combination a motor for driving said valve gate means in a direction from said third position toward said first position.

12. A valve as set forth in claim 10, further comprising in combination biasing means for urging said valve gate means in a direction from said first position toward said third position.

* * * * *